July 20, 1965  W. J. C. TRYTHALL  3,195,960
MATERIAL HANDLING SYSTEMS
Filed July 23, 1963  6 Sheets-Sheet 2

July 20, 1965   W. J. C. TRYTHALL   3,195,960
MATERIAL HANDLING SYSTEMS
Filed July 23, 1963   6 Sheets-Sheet 5

United States Patent Office 3,195,960
Patented July 20, 1965

3,195,960
MATERIAL HANDLING SYSTEMS
William John Courtney Trythall, 44A Archers Road,
Southampton, England
Filed July 23, 1963, Ser. No. 297,123
10 Claims. (Cl. 302—53)

This invention relates to material handling systems of the kind in which a fluid, or a powdered or wet or dry granular substance, is to be conveyed by compressed air along a pipe-line to a receiving point such as, for example, a processing plant for the material.

In such systems the material is initially fed from a hopper into a material-supply vessel that can be subsequently sealed from the hopper and, thereafter, compressed air is passed into the supply vessel to cause the material to be discharged into the aforesaid pipe-line.

In such systems a ready supply of compressed air must be readily available for each supply vessel, and such a supply must be capable of delivering large quantities of compressed air in a short space of time sufficient to cause the contents of the supply vessel to be effectively passed along its pipe-line. Where a plurality of such systems are in use, the compressed air bottles or tanks that are used to store the compressed air occupy a considerable amount of floor space and entail the supply and installation of long lengths of piping interconnecting said bottles or tanks with said supply vessel, said piping being of sufficient diameter to ensure that the compressed air can be delivered to the supply vessels at the required rate.

It is an object of the present invention to provide a supply vessel of the kind stated that incorporates its own compressed air reservoir and thus eliminates the necessity for the separate purchase and installation of suitable reservoirs for the supply vessel.

According to the present invention a material-supply vessel having a closeable opening through which it can be filled with material, and a further opening through which said material can be expelled by means of compressed air when said closeable opening is shut, includes a compressed air reservoir extending completely or partially around material-supply vessel.

In a preferred form the compressed air reservoir uses the whole, or part, of the wall of the material-supply vessel as part of the wall surface of the compressed air reservoir.

The advantage of a material-supply vessel constructed according to the present invention, is that the compressed air reservoir can be built to meet the exact volumetric and pressure requirements called for to expel the contents of the material-supply vessel, since the size of the material-supply vessel and the nature of the material to be handled thereby can be ascertained prior to construction.

A further advantage is that with the material-supply vessel and the compressed air chamber constructed as an integral unit it is a simple matter to interconnect the two with means whereby the compressed air can be passed into the material-supply vessel at the desired rate, the previously referred to and separately installed runs of piping used for this purpose being thereby avoided.

Further, it has been found that there is a considerable saving of floor space when a unit constructed according to the present invention is compared with an equivalent sized material-supply vessel having a separate air pressure supply source located at ground level.

A further advantage is that each material-supply vessel constructed according to the present invention need only have a single and relatively small diameter pressure supply pipe connected to the compressed air reservoir extending therearound, since whilst the material-supply vessel is being recharged with material the air reservoir can be recharging via said supply pipe by means of a compressor.

In order that the invention may be clearly understood reference will now be made to the accompanying drawings, wherein.

Figure 1:
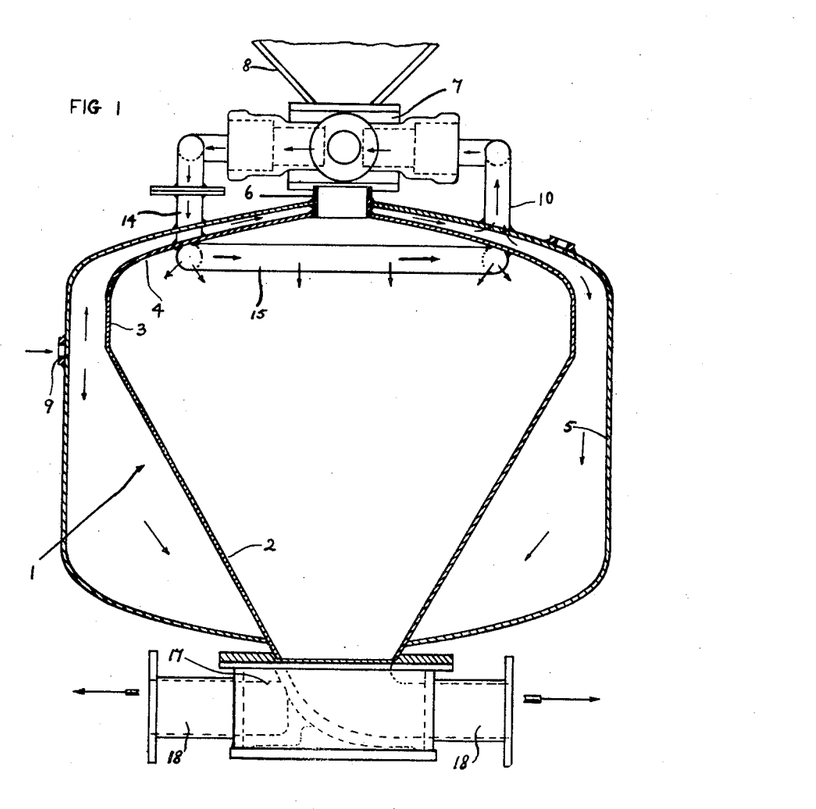
FIG. 1 is a cross-section through a material-supply vessel constructed according to the present invention and from which the material is to be discharged through an opening in the base of the vessel.

In FIG. 1 a material-supply vessel 1 is provided having a frusto-conical lower section 2, a cylindrical intermediate section 3 and a domed top section 4.

Surrounding the material-supply vessel 1 is a compressed-air reservoir 5 of cylindrical form and having outwardly-domed upper and lower end walls. The upper outwardly-domed end wall has a conduit 6 extending therethrough in an airtight manner, and the lower end of the conduit is secured, also in an airtight manner, for example by welding, to an inlet aperture in the domed top section 4 of the material-supply vessel. The upper end of the conduit 6 has an end flange whereby it may be connected to one flange of a valve assembly 7 for closing the entry to the conduit 6 when the vessel 1 is to be subjected to air-pressure to expel the contents therefrom. The opposite flange of the valve assembly 7 is secured to a corresponding flange mounted at the outlet end of a material supplying hopper 8.

The compressed air reservoir 5 has a connection 9 through which compressed air may be admitted from, say, a compressor; and an outlet pipe 10 whereby the stored compressed air may be passed to a pressure regulator 11, a volume control valve 12, and an "on-off" valve 13. When the valve 13 is opened the compressed air passes via a pipe 14 through the compressed air reservoir 5 and into the material-supply vessel 1. For reasons of simplicity the control assembly comprising the regulator 11, the valves 12, 13, and the pipes 10 and 14 have been shown as being arranged in a U-shaped assembly which more or less surrounds one half of the valve assembly 7.

In FIG. 1 the exit end of the pipe 14 is shown as being connected to a diffuser ring 15. The actual shape of the diffuser 15 which may or may not be present, may be of any suitable shape since without it a pipe 14 terminating with its open end facing downwardly will create a tendency for the material in the vessel 1 to cavitate and have a hole blown through it, thus wasting the blow and causing the apparatus to operate inefficiently.

To the frusto-conical opening at the lower end of the material-supply vessel 1 there is secured an annular flange to which is secured the flange of a discharge valve 17 capable of being rotated such that the material being discharged is passed out through any one of a plurality of outlet-pipes 18. The material-supply vessel 1 is fitted with a boss to accept a pressure gauge connection.

Figure 2:
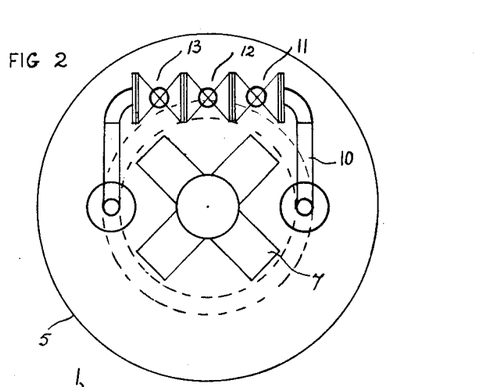
FIG. 2 is a schematic plan view of FIG. 1 drawn to a reduced scale.

It will be seen that in plan view the whole assembly occupies an area that is only slightly in excess of that occupied by the material-supply vessel 1, the reason for this being that in apparatus of this kind the lower end at least of the material-supply vessel 1 must have a sloping surface inclined at an angle that is steeper than the angle of repose of the material being handled. It is the volume below this slope that constitutes the main volume of the compressed-air reservoir 5 and this accounts for the only slightly increased cross-sectional area of the apparatus as a whole.

If no increase in cross-sectional area at all is permitted then it is within the scope of this invention for the material-supply vessel to have a compressed-air reservoir 5 surrounding its frusto-conical section 2 only, the compressed-air reservoir being cylindrical and of the same diameter or less than the cylindrical intermediate section 3.

The assembly may include stiffeners or stiffening bulkheads, not shown, between the compressed-air reservoir 5 and the material-supply vessel 1, for strengthening purposes, and any bulkheads will be formed with holes to allow free movement of air therethrough.

Figure 3:
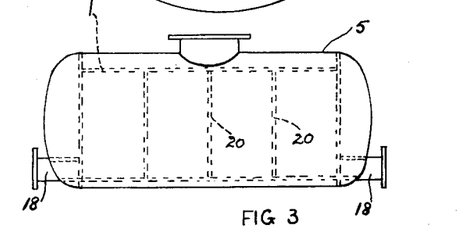
FIG. 3 is a schematic side elevation of a supply vessel according to the present invention and in which the vessel is designed to provide a low overall height and permit the material to be discharged through one or more openings in the end walls of the vessel.
Figure 4:
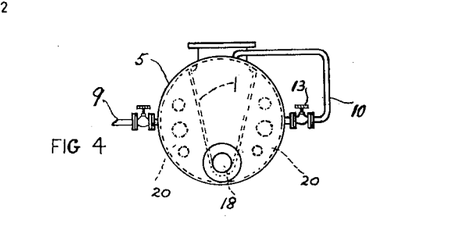
FIG. 4 is an end elevation of FIG. 3.

Referring now to FIGS. 3 and 4 it will be seen that there is shown, schematically, a compressed-air reservoir 5 which is of cylindrical form with its polar axis extending horizontally. A material-supply vessel 1 therein, which is airtight with respect to the compressed-air reservoir 5, is V-shaped, or substantially V-shaped, with the apex of the V pointing downwardly and extending parallel to the polar axis of the compressed-air reservoir 5. The bottom, or apex, of the material-supply vessel 1 may be rounded to a radius equal to, and co-axial with, discharge pipes 18 horizontally disposed at both ends of the vessel 1 so as to form a smooth gully running to the two discharge pipes. The discharge pipes 18 will be associated with valves, not shown, so that either or both may be opened.

A suitably valved air supply pipe 9, leading from a compressor or other main air supply, is connected to the reservoir 5, and a pipe 10 leading from the reservoir 5 interconnects the reservoir 5 with the vessel 1, there being suitable control means in the pipe 10 such as the means 11, 12, 13 described with reference to FIG. 1 but of which only the "on-off" valve 13 is shown.

In a preferred arrangement the outlet from the valve 13 is fed to a diffuser member in the vessel 1, in a similar manner as described with reference to the diffuser 15 in FIG. 1, so as to apply an even distribution of compressed air upon the top of the material in the supply vessel as well as to one or more jets blowing compressed air along the gully in the direction of the outlet pipes 18.

Transversely extending stiffeners 20 may be provided between the cylindrical shell 5 and the supply vessel 1 therein and if these stiffeners are in the form of bulkheads they are perforated to allow compressed air in the cylindrical shell 5 to flow freely between the divisions formed by the bulkheads.

An adjustable baffle member may be incorporated in the supply vessel, this baffle member being spaced from the rounded base of the supply vessel and extending along the length thereof so as to leave a material flow path between each longitudinal edge thereof and the sides of the supply vessel. Such flow paths can be controlled in size such that in association with a correctly proportioned flow of compressed air the material in the supply vessel will flow at an increased velocity through the flow paths between the baffle and the side walls of the vessel and such that the material in the supply vessel can be accurately metered into the discharge pipes.

According to one construction of the preferred form of the invention a single material loading aperture, leading to the supply vessel in the cylindrical shell, is situated at the top of the combined air reservoir and material-supply vessel mid-way along its length and this loading aperture incorporates an airtight closure valve 7 to which can be secured any suitable form of material loading funnel or chute. A suitable material spreading device, for example of conical form, may be provided below the material loading aperture to promote even filling or loading of material into the supply vessel.

In an alternative construction a plurality of material loading apertures, all leading to the supply vessel in the cylindrical shell, are located along the length of the apparatus. In a further embodiment there may, for example, be a loading aperture in each end wall of the supply vessel.

Where a continuous supply of material is required to be delivered by a pipe-line to a desired point, such as a processing plant, a plurality of units of the above described combined compressed air reservoirs and material-supply vessels may be arranged in parallel and used in turn to supply the flow of material. Since the operation of units of this kind call for a large volume of compressed air for a very short period of time the parallel arrangement of the units enables each pressure chamber to have a prolonged air charging period compared with the time required to discharge the air therefrom.

For material-supply vessels of the kind described above the material is initially stored in one or more large hoppers 8, as in FIG. 1, disposed above the supply vessel 1 and at the or each material inlet opening to the supply vessel a valve 7 is necessary to seal off the supply vessel 1 from the hopper or hoppers 62 before compressed air is admitted to the supply vessel 1 to expel the contents therefrom.

When such a valve 7 is opened the material from the hopper or hoppers not only fills the supply vessel but the valve body itself is filled with material and packed tight according to the head of material above it. Such a head in a large hopper may be as much as 50 feet. When the material in the supply vessel is to be discharged by compressed air the valve referred to must be brought to its closed position even though the valve itself is packed with material which is not flowing but in a static state.

Such a valve must not only be capable of closing against the resistance of such packing but must be capable of closing when packed with any kind of material in any grade of hardness and any size up to, say, 1 inch or 2 inch grain size; and to be capable of being airtight or substantially airtight to the air pressure to be used to discharge the contents of the supply vessel, for example a pressure of 80–100 lbs. per square inch.

Figure 5:
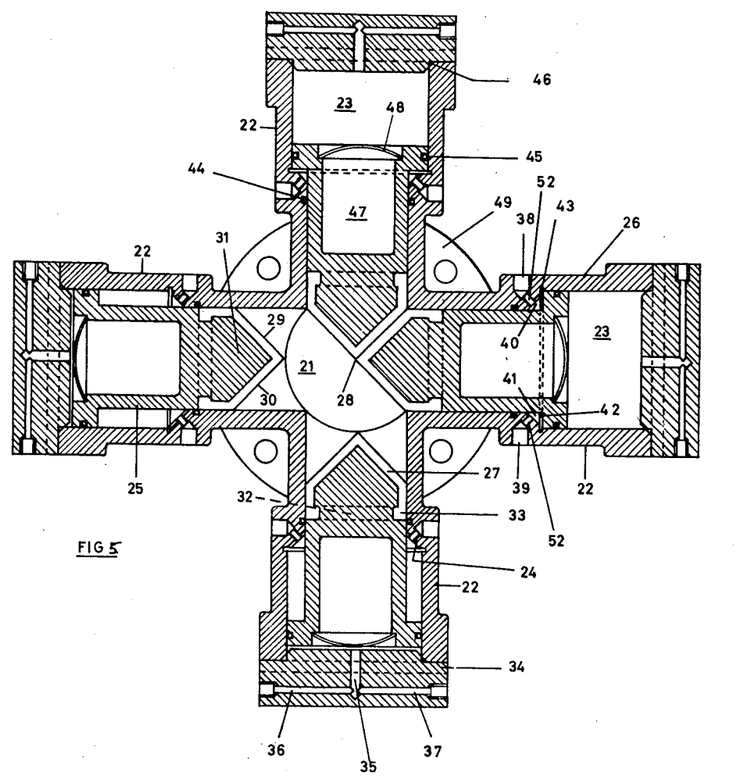
FIG. 5 is a cross-section through a plan view of the valve assembly shown at the top of FIG. 1 for sealing off the top of the material-supply vessel, the view being drawn to a larger scale than FIG. 1.
Figure 6:
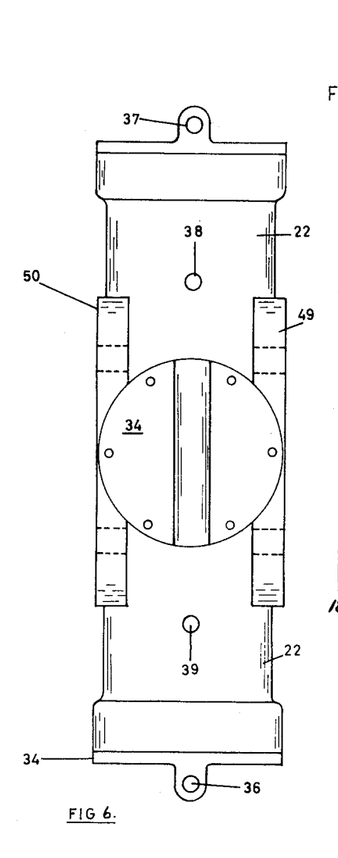
FIG. 6 is an end elevation of FIG. 5.

A valve that is capable of meeting all these requirements is illustrated in FIGS. 5 and 6 and comprises a central flow path 21 from which extends four radially disposed cylinder members 22, the polar axes of the cylinder members 22 lying in a common plane.

Each cylinder member 22 has a bore that is enlarged at its outer end, as at 23, to provide a shoulder 24 within the bore. Slidably housed within each cylinder member 22 is a plunger 25 having a flanged end 26 that is slidable within the enlarged end 23. Each of the plungers is formed or fitted with a conically shaped nose 27 so spaced from the flanged end 26 that when the plunger is moved to its valve closing position the apex 28 of the conically shaped nose 27 is coincident with the polar axis of the central flow path 21 and the nose 27 will have two sides 29, 30 capable of abutting against the sides of the conical noses of its neighbouring plungers on each side thereof when these are moved into their valve closing position.

The conically shaped noses 27 are each illustrated as being a cap of rubber or a synthetic elastic material mounted on a substantially conical shaped extension 31 of the plungers 25, each plunger 25 having a circumferential groove 32 into which an inwardly flanged end 33 of its associated cap is a snap fit. Each plunger 25 and its conically shaped nose 27 may, however, be of metal throughout and may, for example, be of hardened steel.

Each cylinder member 22 is closed at its outer end by an end cap 34 having a blind bore 35 extending from its inner face, said blind bore communicating at its inner end with a valve controlled air-inlet bore 36 and a valve controlled air-outlet bore 37, the valves for said inlet and outlet bores not being illustrated since they may be of any conventional construction. Each end cap 34 is secured to its cylinder member 22 by any suitable means, for example by being bolted thereto.

Each cylinder member 22 has a pair of air conduits 51, 52 extending from bores 38, 39 on the outer periphery of the cylinder member 22 to bores 40, 41 in the shoulder 24. The bores 38, 39 may be screw threaded to accommodate screwed connections to valve units not shown, for example a valve for controlling the supply of air to the bore 38 to cause the plunger to withdraw into the cylinder 22 when only the air outlet opening 37 is open, and a valve for controlling the escape of air from the bore 39 when the plunger 25 is being moved to its closure position by only the air inlet bore 36 being open.

When the conically shaped noses 27 are in contact in the manner illustrated in FIG. 1 a clearance 42 exists between the shoulder 24 and the flange 26, this clearance, as shown, being of the same order as the width of a groove 43 extending around the inner periphery of the enlarged outer end 23. The clearance 42 permits each plunger 25 to be forced inwardly beyond the setting shown until the flange 26 abuts against the shoulder 24 and, in such a setting, the resilient noses 27 are compressed or distorted to ensure a tight seal therebetween. The width of the clearance 42 thus limits the amount by which the noses can be distorted.

The bores 40, 41 in the shoulder 24 can be replaced by an annular conduit extending around the shoulder 24 and opening into the face of the shoulder facing the flanged end 26.

The valve assembly includes appropriate seals where necessary, for example a seal 44 in a groove in the cylinder member 22 and acting on the plunger 25; a seal 45 in a groove in the flanged end 26 and acting on the enlarged bore 23; and a seal between the end cap 34 and the cylinder member 22.

The plunger 25 may be hollow, as at 47, to lower its weight, and to eliminate the resulting increase in air volume within the enlarged end 23 of the bore in the cylinder member the hollow 47 may be sealed off with a disc-like member 48.

The valve assembly has inlet and outlet flanges 49, 50 whereby it may be secured to the flanged base of a hopper and the flanged inlet of a supply vessel.

It will be appreciated that when all four plungers are moved inwardly towards the polar axis of the central flow path, each plunger 25 will, by virtue of its conically shaped nose 27, be capable of pushing its way through any granular material tending to block its path. When the apexes 28 of the four cones eventually meet, they will each abut against their neighbours on each side along a line of contact only and such a line of contact ensures that there will be the minimum possible surface area on which the granular material can act to prevent the valve from being effectively closed. Any such granules of material tending to remain between said lines of contact will be subjected to a shearing action, by virtue of said line of contact, as well as displacement forces tending to pull the granules apart along said line of contact by virtue of the conical shape of the noses 27. As a result, it has been found that granular material, even though densely packed, moves away as the conical noses 27 move to their closure position and so effectively seal the central flow path 21.

It will be noted that the diameter of the conically shaped noses 27 is so related to the diameter of the central flow path 21, that the lines of contact between conically shaped noses 27, when in contact with each other, extend from the polar axis of the flow path 21 to the circumference thereof.

It will be appreciated that the valve assembly described with reference to FIGS. 5 and 6 is by way of example only and that many modifications may be made thereto.

Thus, for example, although four conically shaped noses 27 are used in the example described, there may be only three or even more than four, each with its appropriate cylinder members 22.

Again, although the plungers 25 have been described as being air-operated, they may be operated by liquid under pressure, or by any suitable mechanical means.

The plungers 25 need not, moreover, be so arranged that their polar axes lie in a common plane since it is also possible to arrange their axes so that they lie in the surface of a conic having its polar axis concentric with the polar axis of the central flow path 21, such a conic pointing towards the hopper or towards the supply vessel as desired.

According to a further modification, the central flow path 21 is lined with a sleeve, preferably of resilient material, said sleeve being flanged outwardly at its upper and lower ends so that said flanges can be used to support the sleeve, for example by forcing said flanges to enter recesses in the valve body, said recesses being of slightly less width than the thickness of said flanges. In such a modification only three plungers are preferably used, such an arrangement ensuring that when the conical noses of the plungers flex the sleeve between them the resulting three-armed star formation therebetween of the sleeve will result in a minimum stretching action on the sleeve as well as an effective closure of the sleeve. In this embodiment each conically shaped nose 27 and its conical shaped extension 31 may be replaced by a single integral non-resilient conical head since resilience may now be provided by the sleeve lining the flow path 21. For this reason the clearance gap 42, previously referred to, is still retained such that the three conical heads can each exert a predetermined amount of squeezing strain or distortion on the thickness of the sleeve after the sleeve has been flexed into said star formation.

In yet a further modification the bores 36 and 37 can be replaced by a single bore, provided means coupled thereto is arranged to both supply and receive a pressure medium through said single bore. In a similar manner the bores communicating with the clearance gap 42 can be replaced by a single bore.

The above valve assembly, as described with reference to FIGS. 5 and 6 is the subject matter of my co-pending British application No. 27,513/63.

In the material handling systems described above it is sometimes necessary for a plurality of outlet pipe-lines to be associated with each vessel and for a valve assembly to be included whereby the vessel can be coupled to any one of said outlet pipe-lines.

Suitable valve assemblies for this purpose will now be described with reference to FIGS. 7 to 14.

Figures 7, 14:
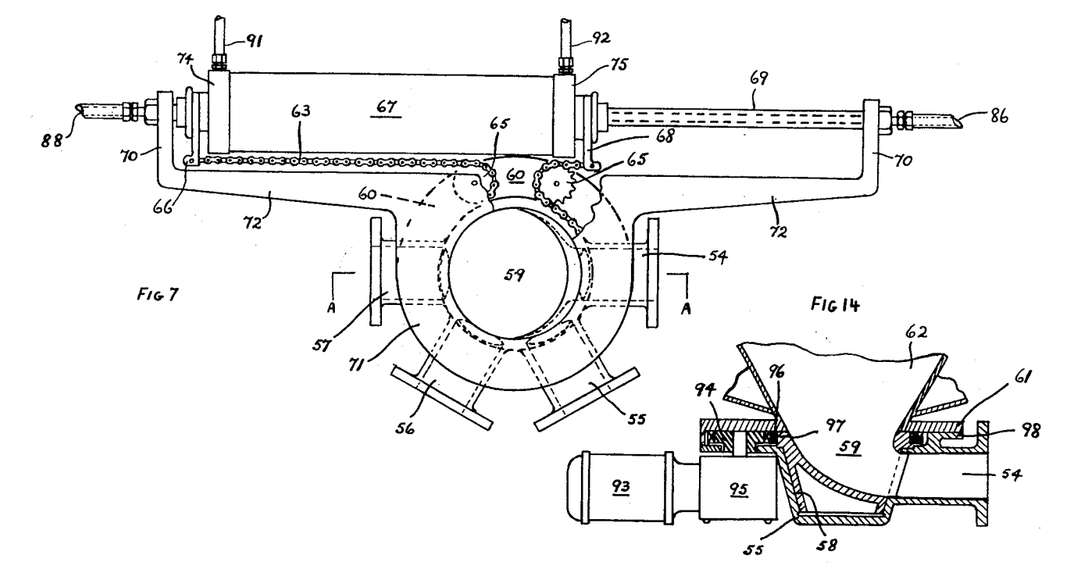
FIG. 7 is a plan view, partly in section, of a valve assembly suitable for mounting on the bottom of the supply vessel described with reference to FIG. 1.
FIG. 14 is a cross-section through a modified valve assembly for mounting on the bottom of the supply vessel as described with reference to FIG. 1.
Figure 8:
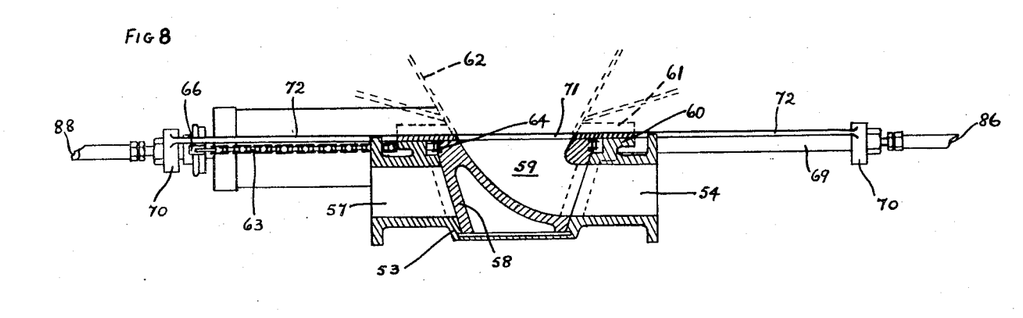
FIG. 8 is a cross section taken along the line A—A of FIG. 7.

Referring first to the valve assembly illustrated in FIGS. 7 and 8, it will be seen that a frusto-conical housing 53 is provided, the housing having four outlet pipes 54, 55, 56, 57 extending radially therefrom. Rotatably mounted within the housing 53 is a frusto-conical plug 58 having a flow path 59 therethrough, said flow path commencing at an inlet at the upper end of the plug and terminating in an outlet in the side wall of the plug, said outlet being so disposed that on rotating the plug about its vertical axis said outlet can be aligned with any selected outlet pipe 54 to 57.

The housing 53 has an annular flange 60 at its upper end, said flange being suitably bored (the bores are not shown) so that it can be bolted to a flange 61 that is integral with a circular discharge end of a material handling vessel 62.

The flow path 59 is so constructed as to create a smooth transition in cross-sectional area between the diameter of the discharge end of the material handling vessel 62 and the diameter of an outlet pipe 54 and 57.

The plug 58 may have sprocket teeth extending circumferentially around its upper end, said teeth being integral with the plug 58 or integral with a ring embracing the plug, the flange 60 being suitably recessed to accommodate the sprocket teeth as well as a chain 63 meshing therewith. As shown, however, rollers of the chain 63 engage on a raised ring 64, integral with or non-rotatably secured to, the upper end of the plug 58, the chain being pinned at its centre to the ring 64 or the plug 58.

The chain 63 is maintained in engagement with the ring 64 by means of two idle sprocket wheels 65 suitably mounted in a recess in the flanged end of the housing 53, one chain end passing around one sprocket wheel 65 before being coupled to a first chain-arm 66 at one end of a reciprocable cylinder unit 67 and the other chain end passing around the other sprocket wheel 65 before being coupled to a second chain-arm 68 at the other end of the reciprocable cylinder unit 67.

The reciprocable cylinder unit 67 is axially displaceable along a tubular axis 69 that is supported by spaced arms 70 on a plate 71. The plate 71 is clamped between the flanges 60 and 61 and has legs 72 extending therefrom on which the arms 70 are mounted. The plate 71 is, of course, suitably apertured so as not to restrict the discharge end of the material-supply vessel 62.

The reciprocable cylinder unit 67, described hereinafter with reference to FIGS. 9 to 13, is so designed that it is capable of adopting any one of four positions along the tubular axis 69. These four positions along the axis 69 are so correlated with respect to the chain drive arrangement that the outlet of the flow path 59 in the plug 58 can be aligned with any selected outlet pipe 54 to 57.

Figure 9:
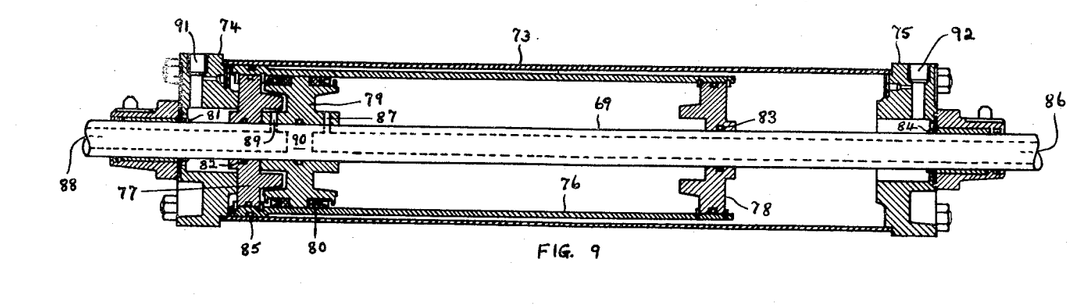
FIG. 9 is a detailed cross-section through a reciprocable cylinder unit suitable for operating the valve described with reference to FIGS. 7 and 8.

Referring now to FIG. 9, illustrating one form of the reciprocable cylinder unit, there is shown a main air cylinder 73 clamped between end members 74, 75, the end members 74, 75, being slidably mounted on the tubular axis 69. Within the main cylinder 73 is a secondary cylinder 76 mounted on end members 77, 78, the end members 77, 78 being slidably mounted on the tubular axis 69.

Mounted non-displaceably on the tubular axis 69 is a piston 79 having a circumferential sealing member 80 that is a sliding fit within the secondary cylinder 76. To render the various components airtight seals 81, 82, 83 and 84 are included between the tubular axis 69 and the end members 74, 77, 78 and 75 respectively; and a seal 85 is included between the secondary cylinder 76 and the main cylinder 73.

The tubular axis 69 is constructed in any suitable manner to act as an air supply conduit 86 extending from one end to convey air to and from an orifice 87 on one side of the stationary piston 79; and to act as an air supply conduit 88 extending from the other end to convey air to and from an orifice 89 on the other side of the stationary piston 79, the two air supply conduits being separated from each other in any suitable manner, for example by the central portion 90. The end member 74 is formed with an air flow path 91 communicating with the air volume present between the end members 74 and 77; and the end member 75 is formed with an air flow path 92 communicating with the air volume present between the end members 75 and 78.

Figure 10:
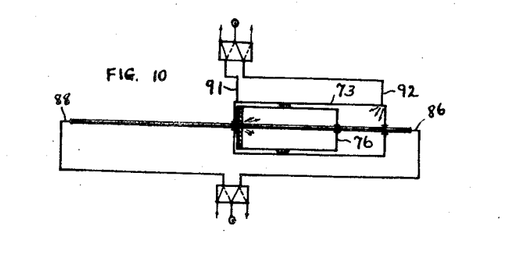
FIGS. 10, 11, 12 and 13 are schematic diagrams illustrating the manner in which the reciprocable cylinder unit operates.

As shown in FIG. 9 the end member 77 in engagement with the stationary piston 79 and hence the secondary cylinder 76 is in its extreme right-hand position. Similarly, the end member 74 is in engagement with the end member 77 and hence the main cylinder 73 is also in its extreme right-hand position. This setting is achieved by admitting air under pressure to the supply conduit 86 and the flow path 92 as is illustrated in FIG. 10.

Figure 11:
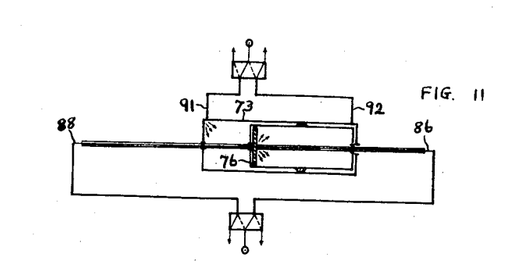

To move the reciprocable cylinder 73 one step towards the left, that is to the setting illustrated in FIG. 11, the air pressure applied to flow path 92 is released by venting said flow path, and air pressure is applied to flow path 91. Since the air pressure supplied via the supply conduit 86 has not been released the secondary cylinder 76 is maintained in its right-hand setting, but since air pressure is now being applied to the flow path 91, and not the flow path 92, the main cylinder 73 moves to the left until its end member 75 abuts against the end member 78. The main cylinder 73 will thus have moved one step to the left and will have moved relatively to the secondary cylinder 76 and the stationary piston 79 as indicated by comparing FIG. 11 with FIG. 10.

Figure 12:
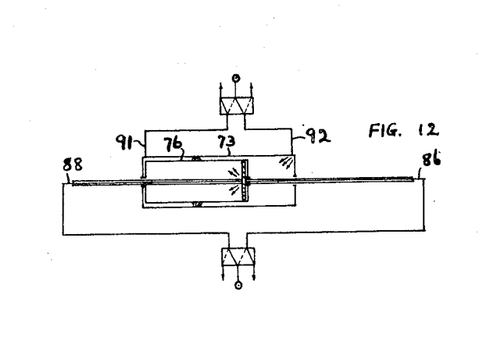

To move the reciprocable cylinder 73 a further increment towards the left, that is to the setting illustrated in FIG. 12, air pressure is applied via the supply conduit 88 and flow path 92 only; supply conduit 86 and flow path 91 being vented. The air pressure in supply conduit 88 causes the secondary cylinder 76 to move to the left until its end flange 78 abuts against the stationary piston 79. At the same time, however, the air pressure supplied via the flow path 92 causes the end member 75 to move away from the end member 78 and so the main cylinder 73 moves relatively to the secondary cylinder 76 in a right-hand direction until the end member 74 abuts against the end member 77. The relative positions of the cylinders 73, 76 and the piston 79, is then as illustrated in FIG. 12 and by comparing FIG. 12 with FIG. 11 it will be seen that the main cylinder 73 has been moved to the left by a further increment.

Figure 13:
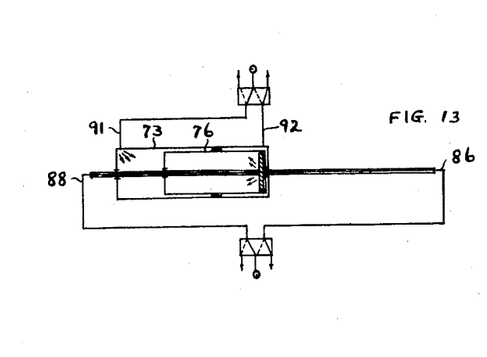

Finally, the main cylinder 73 can be moved to its extreme left-hand setting by supplying compressed air via the supply conduit 88 and the flow path 91, the supply conduit 86 and the flow path 92 being vented. Since the only difference between this arrangement and that described with reference to FIG. 12 is that flow path 92 is vented and flow path 91 is pressurised, the main cylinder 73 is displaced to the left relatively to the secondary cylinder 76 until the end member 75 abuts against the end member 78. The relative positions of the cylinders 73, 76 and the piston 79, is then as illustrated in FIG. 13 and by comparing FIG. 13 with FIG. 12 it will be seen that the main cylinder 73 has been moved to the left by yet a further increment.

The reciprocating cylinder unit may, of course, be modified in various ways provided that the final manner of operation remains the same. Thus, for example, the secondary cylinder 76 may be omitted, the end members 77, 78 being then spaced apart by rods extending through bores formed in the stationary piston 79 (there being seals in said bores), and the peripheral edges of the end members 77, 78 being a sliding fit with the internal surface of the main cylinder 73, there being seals between said end members 77, 78 and the internal surface of the main cylinder 73. In this modification the stationary piston 79 would also have a diameter substantially equal to the internal diameter of the main cylinder 73 so that there is a sliding fit therebetween when a seal, similar to the seal 80, is applied to the periphery of the stationary piston.

Although the reciprocating cylinder 73 has been described with reference to a stationary piston 79 it will be appreciated that it is also possible for the main cylinder 73 to be held stationary to allow the tubular axis 69 to be displaced relatively thereto, the resulting four settings of the tubular axis 69 being then used, by suitable connections, to move the chain 63. Also, the tubular axis 69 could be in two parts suitably joined together at the stationary piston 79. The supply conduits 86, 88, could, moreover, both commence from the same end.

The reciprocable cylinder unit described with reference to FIGS. 9 to 13 forms the subject matter of my British application No. 27,514/63.

The reciprocating cylinder unit described is, of course, applicable to valve assemblies of the kind described wherein there is a choice of four outlet pipes 54 to 57. If only three outlet pipes are present then three fixed positions can be attained by using any of the well known piston and cylinder units arranged to give three locations of movement, whilst for two outlet pipes only a standard piston and cylinder unit is all that is necessary.

It will be appreciated that although compressed air has been stated to be the medium by which the reciprocating means are driven, pressurised liquids may be used as an alternative.

In FIG. 14 the conical plug 58 is driven by means of an electric motor 93 capable of rotating a pinion wheel 94 through reduction gearing 95. The pinion wheel 94 meshes with a gear ring 96 that is integral with or otherwise secured, for example by a force fit, to a cylindrical portion 97 of the conical plug 58. The conical plug 58 and its flow path 59 are as described with reference to FIG. 8.

The conical housing 53 may have two, three or more outlet pipes 54 extending radially therefrom and by appropriately energising the motor 93 the outlet from the flow path 59 can be brought into alignment with any desired outlet. Such alignment is preferably brought about by the use of a circuit employing limit switches.

Thus for example, each pipe outlet may be associated with a limit switch secured to the conical housing 53, or the flange 60, or the flange 61, and each limit switch may have an arm extending through the stationary portion to which it is secured to interact with a single projecting cam carried by, or a recess formed in, a moving part; for example the conical plug 58, a flange 98 on the plug 58, or a flat surface of the gear ring 96.

Whichever outlet pipe is selected the limit switch associated with that pipe is arranged, by means of said circuit, to be the only switch through which the motor 93 is energised and the conical plug 58 is consequently rotated until it has rotated sufficiently to cause said single cam or recess to cause movement of the limit switch arm of said limit switch to open said circuit and stop the motor 93, the stopping position being arranged to be such that the outlet of the flow path 59 is aligned exactly with the selected outlet pipe.

Although the plug 58 has been described and illustrated as being conical it is possible for it to have any other shape and it may, in fact, be of cylindrical form, the housing 53 being suitably constructed to accommodate such plugs.

The valve assemblies described with reference to FIGS. 7, 8 and 14 from the subject matter of my British application No. 27,515/63.

As will now be apparent, the invention provides a material-supply vessel having its own compressed air reservoir and which therefore needs only a relatively small and flexible tube coupled thereto to enable the reservoir to be recharged between each blow from a compressor or the like. When the material-supply vessel is fitted with a valve assembly as described with reference to FIGS. 5 and 6 for the purpose of effectively closing the inlet opening for the material, and a discharge valve as described with reference to FIGS. 7 to 13 for selecting the appropriate direction in which the material is to be discharged, relatively small and flexible tube couplings are again all that are necessary to operate these valves since they are both air-operated.

Similarly, the valve described with reference to FIG. 14 is dependent only upon an electrical circuit and a flexible multi-core electric cable is all that is necessary to control this valve.

The sequence in which compressed air is supplied via said flexible tubes can be controlled from a remote position and, in a similar manner, electric signals for a valve assembly as described with reference to FIG. 14 can also be remotely controlled.

The complete material handling system is also capable of automatic cycling and this may be performed in any one of several ways.

*Automatic cycling by weight*

The complete assembly could be mounted on a load cell that gives an electrical signal according to the weight placed upon it. When a predetermined weight has been received this load cell operates means controlling the valve assembly 7 to cause the valve assembly 7 to close, and then opens the "on-off" valve 13 between the compressed-air chamber 5 and the material-supply vessel 1 to achieve a blow. Such a system would continue to operate as long as the electrical supply and compressed air are available, and weighing is possible in view of the fact that only flexible connections to the material handling system are necessary, such flexible connections including flexible pipes coupled to the outlet pipes, such as pipes 54 to 57.

The same result is achieved by supporting the complete assembly on one or more cantilever arms, or by supporting it by one or more pivoted and weighted arms, arranged to maintain the complete assembly in its raised position until such time as a predetermined weight of material has been received by the material-supply vessel 1. The resulting downward displacement of the assembly is then used to energise a circuit for closing the "on-off" valve 13 and initiating a blow.

To allow for actual movement of the whole vessel assembly, when automatic cycling by weight is carried out, there will be a flexible bellows between (a) the storage hopper 8 and the valve assembly 7, and (b) between the outlet pipes, such as 54 to 57, and the fixed piping installations connected thereto.

*Automatic cycling by volume*

The material-supply vessel 1 is fitted internally with a device that is responsive to high and low levels of the material therein and which, when said level reaches a predetermined upper level results in an electrical signal causing the material inlet valve 7 to close and the "on-off" valve from the compressed air chamber 5 to open thus initiating a blow. Similarly when the level reaches a predetermined lower level the level responsive device causes a second electrical signal to be produced that causes the "on-off" valve 13 to close and the inlet valve 7 to open. The level sensitive device may be any of the well known constructions manufactured for this purpose and would be some such device as a Fielden Tector.

*Automatic cycling by timing*

This method of cycling can be achieved by the use of a small synchronous motor driving a cam shaft, the cams of which operate air valves, or air valves and electric switches, to actuate the inlet valve 7 and the "on-off" valve 13 at predetermined intervals. This is the simplest of the above methods if the material input is steady and the timing cycle can be designed accordingly.

I claim:

1. A material handling system comprising a material-supply vessel having a closeable opening through which the supply vessel can be filled with material, and a further opening through which said material can be expelled by means of compressed air when said closeable opening is shut, a compressed air storage reservoir extending around the material-supply vessel, an air inlet connected to the compressed air reservoir whereby compressed air can be supplied to and stored in the air reservoir, said air reservoir being of a size sufficient to retain a volume of air which can empty the filled material from the supply vessel, and an air flow connection through which compressed air can flow from the compressed air reservoir to the supply vessel, said air flow connection comprising a volume control valve, the arrangement being such that the valve controlled air flow connection can be closed to permit the compressed air reservoir to be charged with compressed air through the air inlet connection whilst the supply vessel has said closeable opening open to receive a charge of material, and such that when the supply vessel has been charged with material and said closeable opening has been shut the valve controlled flow connection can be opened to permit the compressed air in the compressed air reservoir to flow into the supply vessel to discharge the material therein through said further opening.

2. A material handling system as claimed in claim 1 and wherein the closeable opening through which the supply vessel can be filled with material includes at least three plungers, the plungers being capable of moving from a retracted position into a position in which they extend jointly into said opening to close said opening.

3. A material handling system as claimed in claim 2 and wherein said plungers each have a conical nose, each of said noses, in its closure position, being in engagement along two sides with two of the other noses.

4. A material handling system as claimed in claim 2 and wherein the closeable opening is lined with a flexible sleeve and said plungers are each formed with a conical nose, said conical noses, when they extend into said opening, pinching its flexible sleeve between them to effectively close the opening.

5. A material handling system as claimed in claim 1 and wherein the material-supply vessel has a lower portion of inverted frusto-conical form terminating at its lower end in said further opening, the compressed air reservoir extending around said lower portion.

6. A material handling system as claimed in claim 1 and wherein the material-supply vessel has two side walls sloping towards each other in a downward direction to a position where they join to define a gully leading to said further opening.

7. A material handling system as claimed in claim 6 and wherein the valve controlled air flow connection leads to an air diffuser over the material in the supply vessel as well as to a jet through which compressed air can be blown along the gully towards said further opening.

8. A material handling system as claimed in claim 6 and wherein the closeable opening through which the supply vessel can be filled includes at least three plungers, the plungers being capable of moving from a retracted position into a position in which they extend jointly into said opening to close the opening.

9. A material handling system as claimed in claim 8 and wherein said plungers each have a conical nose, each of said noses, in its closure position, being in engagement along two sides with two of the other noses.

10. A material handling system as claimed in claim 8 and wherein the closeable opening is lined with a flexible sleeve and said plungers are each formed with a conical nose, said conical noses, when they extend into said opening, pinching the flexible sleeve between them to effectively close the opening.

References Cited by the Examiner

UNITED STATES PATENTS

| | | | |
|---|---|---|---|
| 1,991,403 | 2/35 | McManamna | 302—53 |
| 2,123,537 | 7/38 | Marr | 302—53 |
| 2,524,919 | 10/50 | Meincke | 302—53 |
| 2,684,872 | 7/54 | Berg | 302—53 |

SAMUEL F. COLEMAN, *Primary Examiner.*

ANDRES H. NIELSEN, *Examiner.*